(12) United States Patent
Lee (10) Patent No.: US 8,315,763 B2
(45) Date of Patent: Nov. 20, 2012

(54) CONTROL APPARATUS FOR VEHICLE

(75) Inventor: Seong Jin Lee, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 650 days.

(21) Appl. No.: 12/535,227

(22) Filed: Aug. 4, 2009

(65) Prior Publication Data

US 2010/0131156 A1    May 27, 2010

(30) Foreign Application Priority Data

Nov. 27, 2008    (KR) ................ 10-2008-0118972

(51) Int. Cl.
*B60R 16/023* (2006.01)
(52) U.S. Cl. .................. 701/36; 701/49; 307/10.1
(58) Field of Classification Search .................. None
See application file for complete search history.

(56) References Cited

U.S. PATENT DOCUMENTS

| | | | | |
|---|---|---|---|---|
| 5,525,977 | A * | 6/1996 | Suman | 340/4.4 |
| 5,777,546 | A * | 7/1998 | Dean et al. | 340/438 |
| 6,718,240 | B1 * | 4/2004 | Suda et al. | 701/36 |
| 6,917,122 | B2 * | 7/2005 | May et al. | 307/9.1 |
| 7,801,162 | B2 * | 9/2010 | Jeon et al. | 370/402 |
| 7,904,569 | B1 * | 3/2011 | Gelvin et al. | 709/229 |
| 2006/0119570 | A1 * | 6/2006 | Searle et al. | 345/156 |
| 2007/0288102 | A1 | 12/2007 | Korzin | |
| 2010/0250063 | A1 * | 9/2010 | Korzin et al. | 701/36 |

FOREIGN PATENT DOCUMENTS

| | | |
|---|---|---|
| FR | 2920373 A1 * | 3/2009 |
| JP | 2003218904 A | 7/2003 |
| JP | 2004-262390 A | 9/2004 |
| JP | 2007-210457 A | 8/2007 |
| KR | 20-0291700 Y1 | 9/2002 |
| KR | 10-2003-0010890 A | 2/2003 |
| KR | 100580054 A | 6/2005 |
| KR | 10-2006-0003949 A | 1/2006 |
| KR | 10-2006-0005122 A | 1/2006 |
| KR | 10-2006-0038051 A | 5/2006 |
| KR | 10-2007-0005386 A | 1/2007 |
| KR | 1020080016297 | 2/2008 |

* cited by examiner

*Primary Examiner* — Michael J. Zanelli
(74) *Attorney, Agent, or Firm* — Edwards Wildman Palmer LLP; Peter F. Corless (57) ABSTRACT

The present invention relates to a control apparatus for vehicle, and in particular, to a control apparatus for vehicle that is capable of changing an operation mode of body controller of vehicle as well as changing various electronic instruments in the vehicle. In particular embodiments, a control apparatus for vehicle that controls various electronic instruments of vehicle according to the present invention includes a key input unit that receives an operation mode selection signal for one of a plurality of operation modes for a specific body controller; and a multimedia CAN communications unit that sends the operation mode selection signal to a body controller through a gateway, receives and displays an operation mode change confirmation signal from the body controller through the gateway.

11 Claims, 6 Drawing Sheets

Fig.1

Automatic Door Lock

| Door Locks | | Auto Door Locks | |
|---|---|---|---|
| Car Setting<br>Trip<br>A/C<br>Vehicle Height | Auto Door Lock<br>Auto Door Unlock<br>Twice Unlock<br>Door Lock Sound<br>Arm by Key | Car Setting<br>Trip<br>A/C<br>Vehicle Height | ☐ OFF<br>☐ Linked Vehicle Speed<br>☐ Linked Shift Lever |

Steering Easy Access

| CAR SETTING | | Steering Easy Access | |
|---|---|---|---|
| Car Setting<br>Trip<br>A/C<br>Vehicle Height | Door Locks<br>Seat Easy Access<br>Steering Easy Access<br>ACC auto OFF delay | Car Setting<br>Trip<br>A/C<br>Vehicle Height | ☐ OFF<br>☐ ON |

CONTROL APPARATUS FOR VEHICLE

CROSS-REFERENCE TO RELATED APPLICATION

This application claims under 35 U.S.C. §119(a) the benefit of Korean Patent Application No. 10-2008-118972, filed on Nov. 27, 2008, the entire contents of which are incorporated herein by reference.

BACKGROUND OF THE INVENTION

The present invention generally relates to a control apparatus for vehicle that controls various electronic instruments of vehicle.

Preferably, a body controller controls a door, switch, and seat of vehicle. The body controller preferably includes a DDM (Drive Door Module) that suitably controls the opening and closing of the door of vehicle, a PSM (Power Seat Module) that suitably controls the position of a seat of vehicle, a SCM (Steering wheel Control Module) that suitably controls the position of a steering wheel of vehicle, and a IPM (Instrument Panel System) that suitably controls supplying power of vehicle.

Preferably, the body controllers have a preset value which is suitably set in advance for operating. For example, in the DDM, a mode according to an automatic locking and unlocking operation of door is preferably set. However, in a conventional vehicle, an operation mode of the body controllers cannot be suitably changed directly by a driver information system (DIS). Preferably, the driver information system is meant to refer to a system that controls various electronic instruments such as various audio systems of vehicle and a DMB terminal or the like.

Accordingly, in the driver information system, various electronic instruments communicate data through a multi CAN (Controller Area Network) communications, whereas the body controller can communicate data through a body CAN communication. Accordingly, a user preferably visits an auto repair shop and ask for the change of the operation mode of the body controllers so as to suitably change the operation mode of the body controllers.

The above information disclosed in this the Background section is only for enhancement of understanding of the background of the invention and therefore it may contain information that does not form the prior art that is already known in this country to a person of ordinary skill in the art.

SUMMARY OF THE INVENTION

The present provides a control apparatus for vehicle by which a user can preferably change the operation mode of body controller as well as various electronic instruments.

Preferably, a control apparatus for vehicle that controls various electronic instruments of vehicle according to the present invention comprises a key input unit that suitably receives an operation mode selection signal for one of a plurality of operation modes for a specific body controller; and a multimedia CAN communications unit that suitably sends the operation mode selection signal to a body controller through a gateway, and then suitably receives and displays an operation mode change confirmation signal from the body controller through the gateway.

In accordance with preferred embodiments of the present invention, the multimedia CAN communications unit suitably transceives the operation mode selection signal and the operation mode change confirmation signal with a multimedia CAN communications unit of the gateway through a multimedia CAN network, a conversion unit of the gateway suitably converts the operation mode selection signal and the operation mode change confirmation signal into a body CAN network format transmitting, and a body CAN communications unit of the gateway suitably transceives the operation mode selection signal and operation mode change confirmation signal converted into the body CAN network format with the plurality of the body controllers through the body CAN network.

In accordance with further preferred embodiments of the present invention, a control apparatus for vehicle that suitably controls various electronic instruments of a vehicle further includes a display unit that suitably displays a list of a plurality of controllable operation modes that are suitably classified by a plurality of body controllers.

In accordance with other preferred embodiments of the present invention, the multimedia CAN communications unit, before receiving the operation mode selection signal and suitably sending it to the gateway, preferably sends a present mode confirmation request signal to the body controller through the gateway, and then suitably receives a present mode transfer signal generated in response to the present mode confirmation request signal from the body controller through the gateway and suitably displays a present operation mode of the body controller to a user.

In accordance with further preferred embodiments of the present invention, the body controller is preferably comprised of one of DDM (Drive Door Module), PSM (Power Seat Module), SCM (Steering Wheel Control Module) or IPM (Instrument Panel System), wherein the operation mode of the DDM is an operation mode according to an automatic door locking mode or un-locking mode, wherein the operation mode of the PSM is an operation mode according to an on and off operation of Seat Easy Access, wherein the operation mode of the SCM is an operation mode according to an on and off operation of Steering Easy Access, and wherein the operation mode of the IPM is a mode by time of automatic blocking of power supply of vehicle.

Preferably, the control apparatus for vehicle of the present invention provides an effect of easily changing the operation mode of the body controller without a the user visiting an auto repair shop, since the user can suitably change the operation mode of the body controller as well as the control of various electronic instruments.

In further preferred embodiments, the control apparatus for a vehicle of the present invention suitably controls the body controller through a gateway without fully changing an existing control device by suitably communicating with the body controller through the gateway such that a signal is suitably mutually connected according to different types of communications between a body controller and a head unit.

According to further preferred embodiments, the control apparatus for a vehicle of the present invention preferably provides an effect of simply changing the operation mode of the body controller while the user preferably looks at a current operation mode and changeable operation modes of the body controller through a display unit and a key input unit.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum).

As referred to herein, a hybrid vehicle is a vehicle that has two or more sources of power, for example both gasoline-powered and electric-powered.

The above features and advantages of the present invention will be apparent from or are set forth in more detail in the accompanying drawings, which are incorporated in and form a part of this specification, and the following Detailed Description, which together serve to explain by way of example the principles of the present invention.

BRIEF DESCRIPTION OF THE DRAWINGS

The above and other features of the present invention will now be described in detail with reference to certain exemplary embodiments thereof illustrated by the accompanying drawings which are given hereinafter by way of illustration only, and thus are not limitative of the present invention, and wherein.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

DETAILED DESCRIPTION

In one aspect, the present invention features a control apparatus for a vehicle that controls various electronic instruments of the vehicle comprising a key input unit that receives an operation mode selection signal, and a multimedia CAN communications unit that sends the operation mode selection signal to a body controller through a gateway.

In one embodiment, the key input unit receives an operation mode selection signal for one of a plurality of operation modes for a specific body controller.

In another embodiment, the multimedia CAN communications unit receives and displays an operation mode change confirmation signal from the body controller through the gateway.

In another further embodiment, the multimedia CAN communications unit further transceives the operation mode selection signal and the operation mode change confirmation signal with a multimedia CAN communications unit of the gateway through a multimedia CAN network.

In still a further embodiment, a conversion unit of the gateway converts the operation mode selection signal and the operation mode change confirmation signal into a body CAN network format transmitting, and a body CAN communications unit of the gateway transceives the operation mode selection signal and operation mode change confirmation signal converted into the body CAN network format with the plurality of the body controllers through the body CAN network.

The invention also features a motor vehicle comprising the control apparatus for a vehicle as described in any one of the aspects herein.

Figure 1:
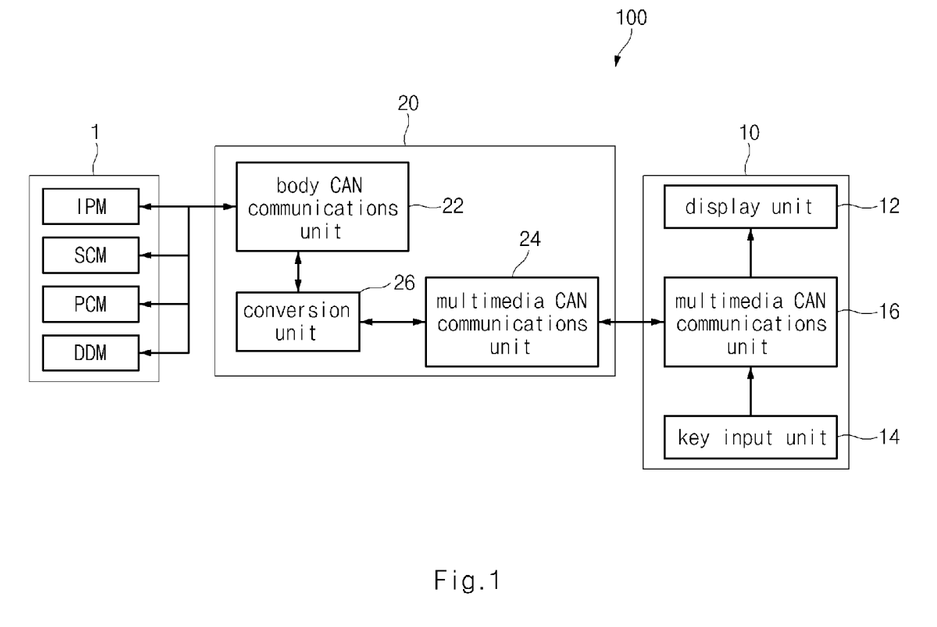
FIG. 1 is a block diagram showing a preferred configuration of a vehicle control system of the present invention.

Hereinafter, exemplary embodiments of the present invention will be described in detail with reference to the attached drawings According to one preferred embodiment, and as shown in FIG. 1, a block diagram shows a configuration of a vehicle control system 100 of the present invention.

According to other preferred exemplary embodiments, FIGS. 2 to 5 show screen diagrams of display units of a body controller of vehicle of the present invention.

Preferably, for example, as shown in FIG. 1, the control system of the present invention includes a controller 10 and a gateway 20.

According to certain exemplary embodiments, the controller 10 includes a display unit 12, a key input unit 14 and a multimedia CAN communications unit 16.

Preferably, generally, the controller 10 is meant to refer to a driver information system (DIS) that suitably controls various electronic instruments such as, but not limited to, various vehicle audio systems, a DMB terminal, and a navigation system.

According to further preferred embodiment, In the display unit 12, a list of a plurality of operation modes which are suitably controllable per a plurality of body controller 1 is preferably displayed. In further preferred embodiments, the body controller 1 includes, but may not be only limited to, a DDM (Drive Door Module), PSM (Power Seat Module), SCM (Steering wheel Control Module) or IPM (Instrument Panel System).

Figure 2:
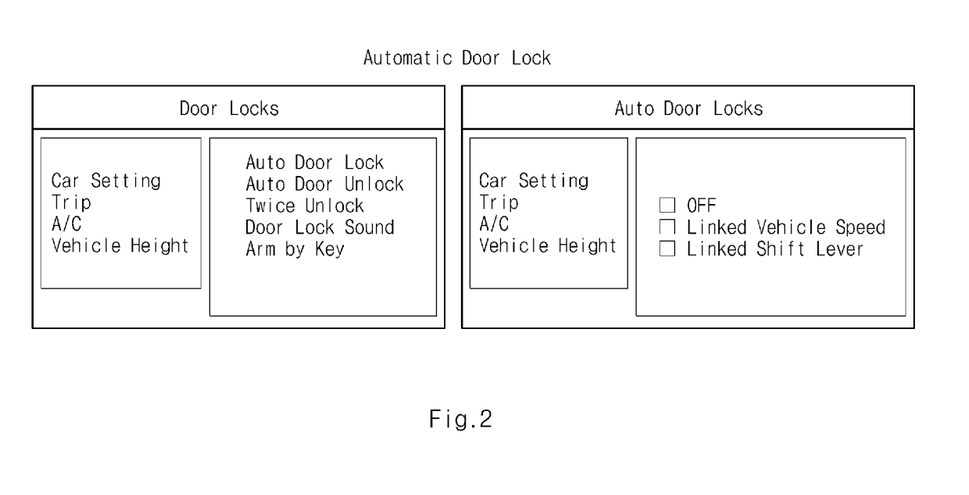
FIGS. 2 to 5 are screen diagrams of exemplary display units of a control apparatus for a vehicle according to preferred embodiments of the present invention.

According to other further embodiments, for example referring to FIG. 2, the DDM is a preferably body controller 1 that suitably controls the opening and closing of door. Preferably, the operation mode of DDM includes an automatic door lock mode according to an excess of given speed (Linked Vehicle Speed), a cancel mode (OFF), an automatic door lock mode according to a location of transmission lever (Linked Shift Lever).

Figure 3:
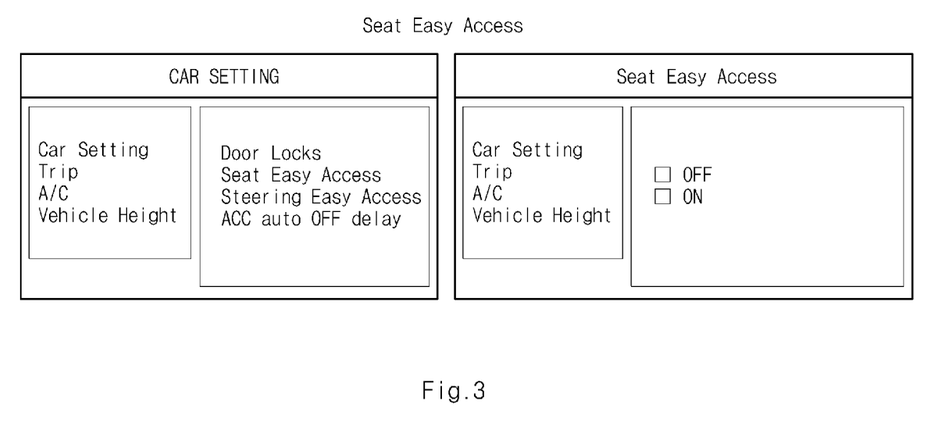

According to other preferred embodiments, referring for example to FIG. 3, the PSM is preferably a body controller 1 that suitably controls a seat of vehicle. According to certain exemplary embodiments, the operation mode of PSM includes operation (ON) and cancel (OFF) modes of Seat Easy Access. Preferably, the operation mode of PSM is used to suitably adjust the position of seat according to a form of driver when the driver starts engine of the vehicle. Preferably, in other exemplary embodiments, the operation mode of PSM is also used, for example, when the driver stops the engine of the vehicle, to change the state of the seat to be in a preferably comfortable state so that the driver can easily get out of the vehicle.

Figure 4:
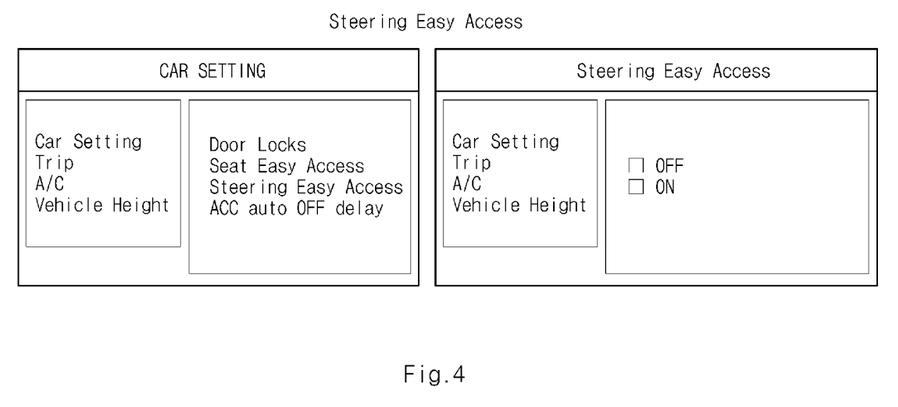

According to other preferred embodiments of the present invention, and referring for example to FIG. 4, the SCM is preferably a body controller 1 that suitably controls a steering wheel of vehicle. Preferably, the operation mode of SCM includes operation (ON) and cancel (OFF) modes of Steering Easy Access. According to preferred embodiments, the operation mode of SCM is used, when the driver starts engine of the vehicle, to move the steering wheel forward so that the driver can easily grasp the steering wheel. Preferably, in other embodiments, the operation mode of SCM is also used, when the driver stops the engine of the vehicle, to move the steering wheel backward so that the driver can easily get out of the vehicle.

Figure 5:
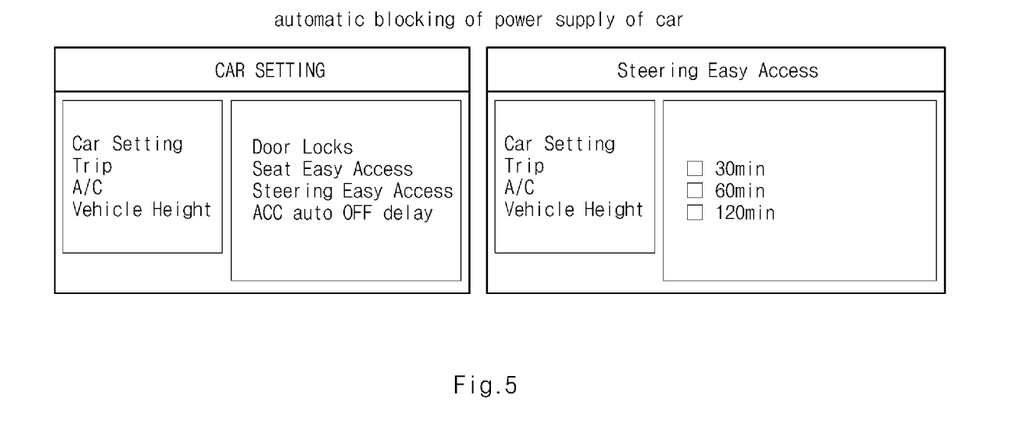

According to other preferred embodiment of the invention and referring, for example, to FIG. 5, the IPM is a preferably body controller 1 that suitably manages a power supply of vehicle. Preferably, the operation mode of IPM includes a mode by time of automatic blocking of power supply of vehicle (ACC auto OFF delay), for example, but not limited to, a 30 minutes mode (30 min), a 60 minutes mode (60 min) and a 120 minutes mode (120 min). In certain preferred embodiments, the operation mode of the IPM is used to preferably select a time to block the power supply of vehicle for suitably preventing the discharge of battery after a given time is elapsed, when a lamp or an audio uses the power of battery in case of a key-off state of vehicle.

In other preferred embodiments, referring to FIG. 1, for example, preferably, the key input unit 14 is a rotary dial which can suitably receive a pressure signal and a rotation signal. Preferably then, the user can suitably select a specific operation mode by pressurizing while moving between a plurality of controllable operation modes by body controller 1 which is suitably displayed in the display unit 12 through the key input unit 14. Accordingly, the key input unit 14 suitably generates an operation mode selection signal according to the specific operation mode, for example, in case of IPM, one operation mode selected by the user among a 30 minutes mode, a 60 minutes mode or a 120 minutes mode.

In other preferred embodiments, the multimedia CAN communications unit preferably sends the operation mode selection signal for the specific operation mode to a multimedia CAN communications unit of gateway 20. Further, the multimedia CAN communications unit suitably receives an operation mode change confirmation signal from the multimedia CAN communications unit of gateway 20.

In still further preferred embodiments, the gateway 20 preferably includes, but may not be limited only to, a body CAN communications unit 22, a multimedia CAN communications unit 24 and a conversion unit 26. The body CAN communications unit 22 transmits a signal by using the plurality of body controllers 1 and a body CAN network. Preferably, the multimedia CAN communications unit transmits a signal by using the controller 10 and a multimedia CAN network. Further, the conversion unit 26 enables a signal to be mutually connected between the body CAN network and the multimedia CAN network.

According to further preferred embodiments of the present invention, the body CAN network comprises a communications protocol that suitably gives and takes a control signal between the body controllers 1. Preferably, the multimedia CAN network is a communications protocol that suitably gives and takes a control signal between control devices 10. The body CAN network and the multimedia CAN network are well known in the art.

The operation of control system 100 of a vehicle according to certain preferred embodiments of the present invention are illustrated herein.

Figure 6:
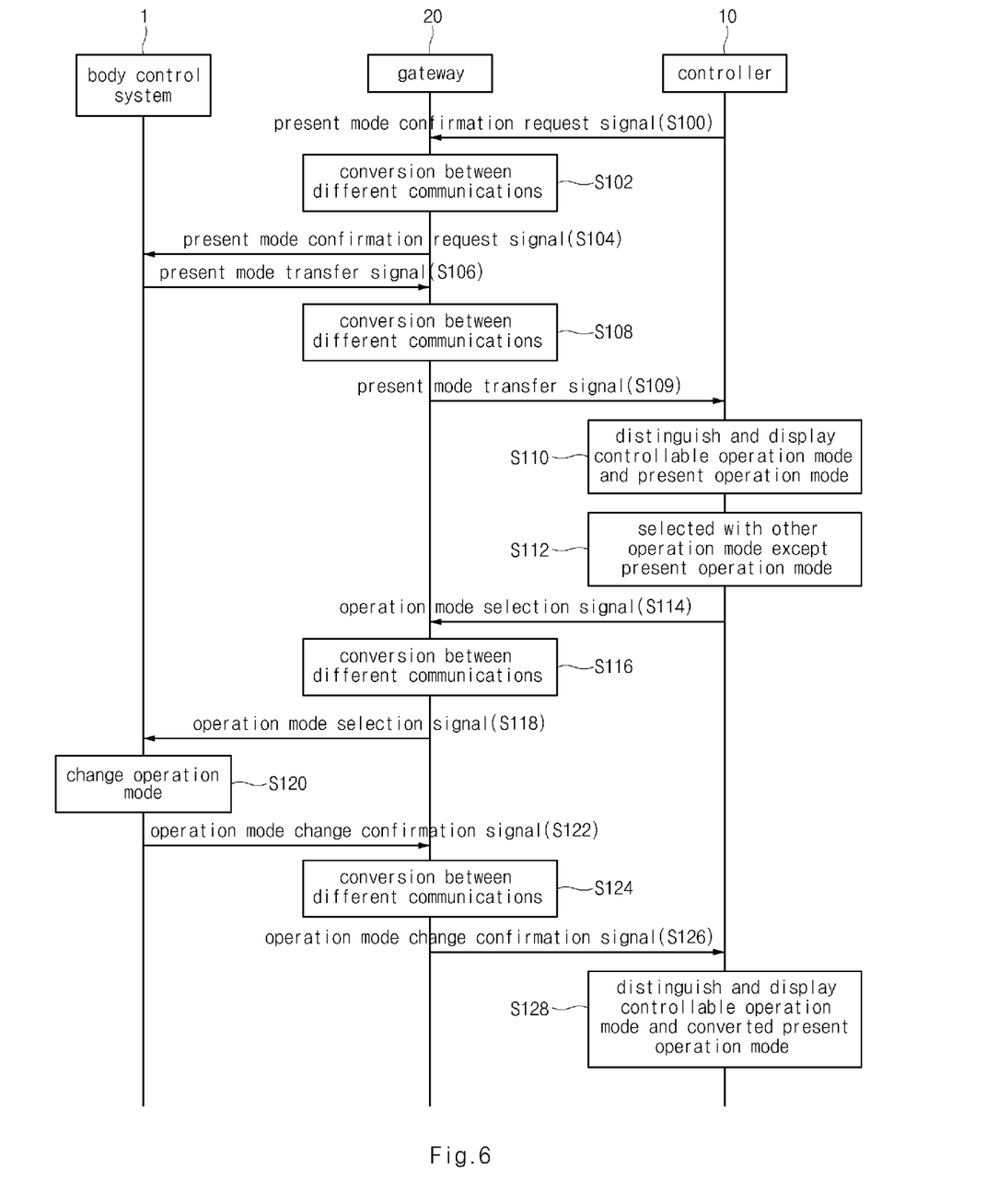
FIG. 6 is a flowchart showing the operation of an exemplary vehicle control system of the present invention.

According to certain preferred embodiments and as shown in FIG. 6, a flowchart shows the operation of vehicle control system of the present invention.

As shown in FIG. 6, a multimedia CAN communications unit of controller 10 suitably sends a present mode confirmation request signal for a specific body controller 1 to a multimedia CAN communications unit of gateway 20 (S100).

Preferably, a conversion unit 26 of the gateway 20 suitably converts the present mode confirmation request signal according to a received multimedia CAN communications into a present mode confirmation request signal according to a body CAN communications (S102).

Preferably, the conversion unit 26 of the gateway 20 sends the converted confirmation request signal to a body CAN communications unit 22. In further exemplary embodiments, the body CAN communications unit 22 of the gateway 20 suitably sends the present mode confirmation request signal according to the body CAN communications to a corresponding body controller 1 (S104).

Further, the body CAN communications unit 22 of the gateway 20 suitably receives a present mode transfer signal generated in response to the present mode confirmation request signal from the body controller 1 (S106).

According to further preferred embodiments, the body conversion unit 26 of the gateway 20 suitably converts the present mode transfer signal according to the body CAN network into a present mode transfer signal according to the multimedia CAN network (S108).

Preferably, the body conversion unit 26 of the gateway 20 sends the converted present mode transfer signal to the multimedia CAN communications unit 24 of gateway 20.

Preferably, the multimedia CAN communications unit 24 of the gateway 20 suitably sends the present mode transfer signal according to the multimedia CAN network to the multimedia CAN communications unit 16 of controller 10 (S108).

Preferably, the display unit 12 of the controller 10 suitably the present mode transfer signal of the specific body controller 1 among a plurality of controllable operation modes (for example, in case the body controller is IPM, 30M is suitably displayed with being separated from 60M and 120M) (S110).

According to further preferred embodiments, the key input unit 14 of the controller 10 is suitably selected with other operation modes, except the present operation mode, among the plurality of operation modes (for example, in case the body controller is IPM, it is 60M) (S112).

Preferably, then the multimedia CAN communications unit 16 of the controller 10 suitably sends an operation mode selection signal for the other operation mode to the multimedia CAN communications unit 24 of gateway 20 (S114).

In a further embodiments, the conversion unit 26 of the gateway 20 suitably converts the operation mode selection signal according to the multimedia CAN network into an operation mode selection signal according to body CAN network (S116).

Preferably, the conversion unit 26 of the gateway 20 suitably sends the converted operation mode selection signal to the body CAN communications unit 22 of gateway 20.

According to further preferred embodiments, the body CAN communications unit 22 of the gateway 20 sends the operation mode selection signal according to the body CAN network to the body controller 1 (S118).

Preferably then, according to the operation mode selection signals, the body controller 1 suitably changes the operation mode of the body controller 1 (S120) and then suitably generates an operation mode change confirmation signal.

Further, the body controller 1 suitably sends the generated operation mode change confirmation signal to the conversion unit 26 of the gateway 20 (S122).

Preferably, the conversion unit 26 of the gateway 20 suitably converts the operation mode change confirmation signal according to the body CAN network into an operation mode change confirmation signal according to the multimedia CAN network (S124).

Preferably, the conversion unit 26 of the gateway 20 sends the converted operation mode change confirmation signal to the multimedia CAN communications unit 24 of gateway 20.

Preferably, the multimedia CAN communications unit 24 of the gateway 20 suitably sends the operation mode change confirmation signal according to the multimedia CAN network to the multimedia CAN communications unit 16 of controller 10 (S126).

Preferably, the display unit 12 of the controller 10, based on the suitable operation mode change confirmation signal, then distinguishes and suitably displays the operation mode according to the operation mode change confirmation signal among a plurality of operation modes(for example, in a case where the body controller is IPM, 60M is suitably distinguished from 30M and 120M to display) (S128).

It will be apparent to those skilled in the art that various modifications and variation can be made in the present invention without departing from the spirit or scope of the invention. Thus, it is intended that the present invention cover the modifications and variations of this invention provided they come within the scope of the appended claims and their equivalents.

What is claimed is:

1. A control apparatus for vehicle that controls various electronic instruments of vehicle, the control apparatus for vehicle comprising:
    a key input unit that receives an operation mode selection signal for one of a plurality of operation modes for a specific body controller; and
    a multimedia CAN communications unit that sends the operation mode selection signal to a body controller through a gateway and receives an operation mode change confirmation signal from the body controller through the gateway.

2. The control apparatus for vehicle of claim 1, wherein, the multimedia CAN communications unit transceives the operation mode selection signal and the operation mode change confirmation signal with a multimedia CAN communications unit of the gateway through a multimedia CAN network, a conversion unit of the gateway converts the operation mode selection signal and the operation mode change confirmation signal into a body CAN network format transmitting, and a body CAN communications unit of the gateway transceives the operation mode selection signal and operation mode change confirmation signal converted into the body CAN network format with the body controllers through the body CAN network.

3. The control apparatus for vehicle of claim 1, further comprising a display unit that displays a list of a plurality of controllable operation modes classified by a plurality of body controllers.

4. The control apparatus for vehicle of claim 1, wherein the multimedia CAN communications unit, before receiving the operation mode selection signal and sending to the gateway, sends a present mode confirmation request signal to the body controller through the gateway, and receives a present mode transfer signal generated in response to the present mode confirmation request signal from the body controller through the gateway.

5. The control apparatus for vehicle of claim 1, wherein the body controller is comprised of one of DDM (Drive Door Module), PSM (Power Seat Module), SCM (Steering Wheel Control Module) or IPM (Instrument Panel System),
    wherein the operation mode of the DDM is an operation mode according to an automatic door locking mode or un-locking mode,
    wherein the operation mode of the PSM is an operation mode according to an on and off operation of Seat Easy Access,
    wherein the operation mode of the SCM is an operation mode according to an on and off operation of Steering Easy Access, and
    wherein the operation mode of the IPM is a mode by time of automatic blocking of power supply of vehicle.

6. A motor vehicle comprising the control apparatus for a vehicle of claim 1.

7. The control apparatus for a vehicle that controls various electronic instruments of the vehicle comprising:
    a key input unit that receives an operation mode selection signal; and
    a multimedia CAN communications unit that sends the operation mode selection single to a body controller through a gateway, wherein the multimedia CAN communications unit receives an operation mode change confirmation signal from the body controller through the gateway.

8. The control apparatus for a vehicle of claim 7, wherein the key input unit receives an operation mode selection signal for one of a plurality of operation modes for a specific body controller.

9. The control apparatus for vehicle of claim 7, wherein the multimedia CAN communications unit further transceives the operation mode selection signal and an operation mode change confirmation signal with a multimedia CAN communications unit of the gateway through a multimedia CAN network.

10. The control apparatus for vehicle of claim 9, wherein a conversion unit of the gateway converts the operation mode selection signal and the operation mode change confirmation signal into a body CAN network format transmitting, and a body CAN communications unit of the gateway transceives the operation mode selection signal and operation mode change confirmation signal converted into the body CAN network format with the body controllers through the body CAN network.

11. A motor vehicle comprising the control apparatus for a vehicle of claim 7.

* * * * *